(12) United States Patent
Ylamurto

(10) Patent No.: US 10,455,368 B2
(45) Date of Patent: Oct. 22, 2019

(54) SYSTEMS AND METHODS FOR PROVIDING COMMUNICATIONS WITHIN WIRELESS SENSOR NETWORKS BASED ON AT LEAST ONE PERIODIC GUARANTEED TIME SLOT FOR SENSOR NODES

(71) Applicant: Locix, Inc., San Bruno, CA (US)

(72) Inventor: Tommi Ylamurto, Los Gatos, CA (US)

(73) Assignee: Locix, Inc., San Bruno, CA (US)

( * ) Notice: Subject to any disclaimer, the term of this patent is extended or adjusted under 35 U.S.C. 154(b) by 0 days.

(21) Appl. No.: 14/925,889

(22) Filed: Oct. 28, 2015

(65) Prior Publication Data

US 2017/0127410 A1 May 4, 2017

(51) Int. Cl.
*H04W 4/06* (2009.01)
*H04W 4/70* (2018.01)

(52) U.S. Cl.
CPC .............. *H04W 4/06* (2013.01); *H04W 4/70* (2018.02)

(58) Field of Classification Search
None
See application file for complete search history.

(56) References Cited

U.S. PATENT DOCUMENTS

| | | | |
|---|---|---|---|
| 8,121,080 B2 | 2/2012 | Ham et al. | |
| 2003/0169697 A1* | 9/2003 | Suzuki | H04L 47/14 370/310 |
| 2006/0072487 A1* | 4/2006 | Howard | H04W 52/0225 370/311 |
| 2006/0198346 A1* | 9/2006 | Liu | H04W 40/24 370/338 |
| 2006/0227729 A1 | 10/2006 | Budampati et al. | |
| 2007/0150565 A1 | 6/2007 | Ayyagari et al. | |

(Continued)

FOREIGN PATENT DOCUMENTS

| | | |
|---|---|---|
| EP | 3251426 | 12/2017 |
| JP | 2010251887 | 11/2010 |

(Continued)

OTHER PUBLICATIONS

Anastasi, Giuseppe, et al., "Energy conservation in wireless sensor networks: A survey", *Ad Hoc Networks* 7, No. 3 (2009): pp. 537-568.

(Continued)

*Primary Examiner* — Gregory B Sefcheck
*Assistant Examiner* — Jenkey Van
(74) *Attorney, Agent, or Firm* — Jaffery Watson Mendonsa & Hamilton LLP

(57) ABSTRACT

Systems and methods for providing communications within wireless sensor networks based on at least one periodic guaranteed time slot for sensor nodes are disclosed herein. In one embodiment, a system includes a hub having one or more processing units and RF circuitry for transmitting and receiving communications in a wireless network architecture. The system also includes a plurality of sensor nodes each having a wireless device with a transmitter and a receiver to enable bi-directional communications with the hub in the wireless network architecture. The one or more processing units of the hub are configured to execute instructions to negotiate a timing of the at least one periodic guaranteed time slot for the plurality of sensor nodes once using a single timeslot definition signal.

19 Claims, 13 Drawing Sheets

(56) References Cited

U.S. PATENT DOCUMENTS

| | | | |
|---|---|---|---|
| 2008/0253327 A1 | 10/2008 | Kohvakka et al. | |
| 2009/0103469 A1 | 4/2009 | Smith et al. | |
| 2010/0110888 A1 | 5/2010 | Park et al. | |
| 2010/0226342 A1 | 9/2010 | Colling et al. | |
| 2011/0188391 A1 | 8/2011 | Sella et al. | |
| 2011/0299423 A1 | 12/2011 | Shim et al. | |
| 2012/0092155 A1* | 4/2012 | Abedi | H04W 74/0875 340/539.12 |
| 2012/0171954 A1* | 7/2012 | Rudland | H04B 13/005 455/41.1 |
| 2012/0207062 A1 | 8/2012 | Corbellini et al. | |
| 2013/0023278 A1 | 1/2013 | Chin | |
| 2013/0195083 A1 | 8/2013 | Kim et al. | |
| 2013/0208667 A1 | 8/2013 | Merlin et al. | |
| 2014/0023049 A1* | 1/2014 | Strecker | H04W 4/006 370/336 |
| 2014/0046495 A1 | 2/2014 | Magnussen et al. | |
| 2014/0192695 A1 | 7/2014 | Priyantha et al. | |
| 2014/0249688 A1 | 9/2014 | Ansari et al. | |
| 2014/0293850 A1 | 10/2014 | Huang et al. | |
| 2015/0078232 A1* | 3/2015 | Djinki | H04W 74/02 370/311 |
| 2016/0373940 A1* | 12/2016 | Splitz | H04W 24/02 |
| 2017/0070992 A1* | 3/2017 | Matsuo | H04W 72/12 |

FOREIGN PATENT DOCUMENTS

| | | |
|---|---|---|
| WO | WO-2010143756 | 12/2010 |
| WO | WO-2014/007417 | 1/2014 |
| WO | 2016123249 A1 | 8/2016 |

OTHER PUBLICATIONS

Darif, Anouar, et al., "Performance Evaluation of IR-UWB Compared to Zigbee in Real time Applications for Wireless Sensor Networks", *Journal of Convergence Information Technology* 8, No. 15 (2013).

Gutierrez, Jose A., et al., "IEEE 802.15. 4: a developing standard for low-power low-cost wireless personal area networks", *network, IEEE* 15, No. 5 (2001): pp. 12-19.

Kinney, Patrick, et al., "technology: Wireless control that simply works", *Communications design conference*, vol. 2. 2003.

Lee, Jin-Shyan, et al., "A comparative study of wireless protocols: Bluetooth, UWB, ZigBee, and Wi-Fi", *Industrial Electronics Society, 2007. IECON 2007. 33rd Annual Conference of the IEEE*, pp. 46-51. IEEE, 2007.

Lee, Myung J., et al., "Emerging standards for wireless mesh technology", *Wireless Communications, IEEE* 13, No. 2 (2006): pp. 56-63.

Schmid, Thomas, et al., "Disentangling wireless sensing from mesh networking", *Proceedings of the 6th Workshop on Hot Topics in Embedded Networked Sensors*, p. 3. ACM, Jun. 28, 2010.

Sugano, Masashi, et al., "Low-Energy-Consumption Ad Hoc Mesh Network Based on Intermittent Receiver-driven Transmission", *ICGST-CNIR Journal*, vol. 9, Issue 1, Jul. 2009, 8 pages.

Notification of Transmittal of the International Search Report and the Written Opinion of the International Searching Authority for PCT/US2016/015188 dated Jul. 4, 2016, 16 pages.

Non-Final OA for U.S. Appl. No. 15/007,119, dated Nov. 9, 2017, 11 pages.

Notice of Publication for CN Application No. 2016800075645, Publication No. CN107409271A, dated Dec. 13, 2017.

Office Action for U.S. Appl. No. 15/007,119, dated Sep. 11, 2018, 8 pages.

Extended European Search Report for EP Application No. 16744056. 9, dated Oct. 4, 2018, 10 pages.

Notice of Allowance from U.S. Appl. No. 15/007,119, dated May 23, 2018, 5 pages.

Final Office Action for U.S. Appl. No. 15/007,119, dated May 3, 2019, 10 pages.

Office Action for U.S. Appl. No. 15/007,119, dated Jan. 10, 2019, 15 pages.

* cited by examiner

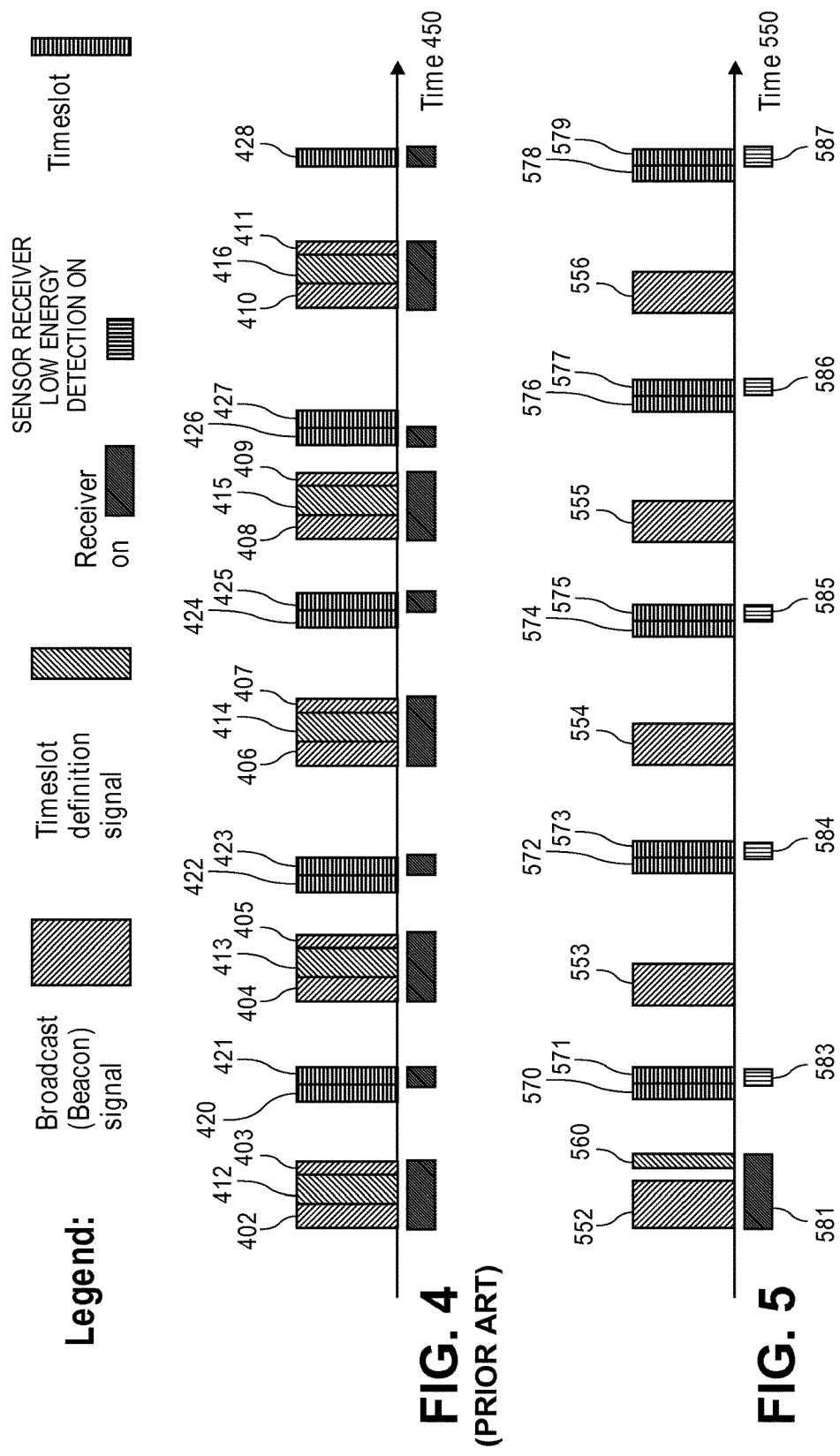

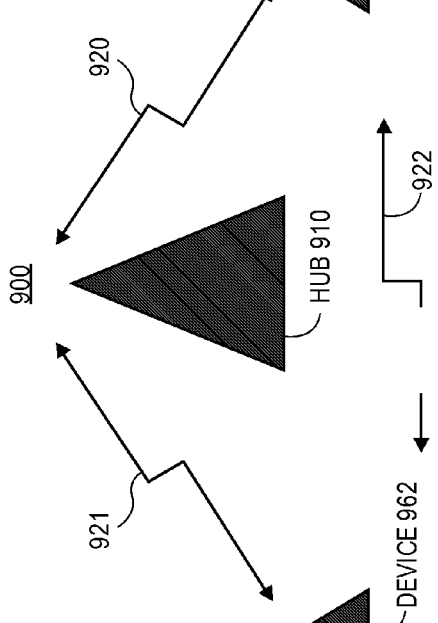
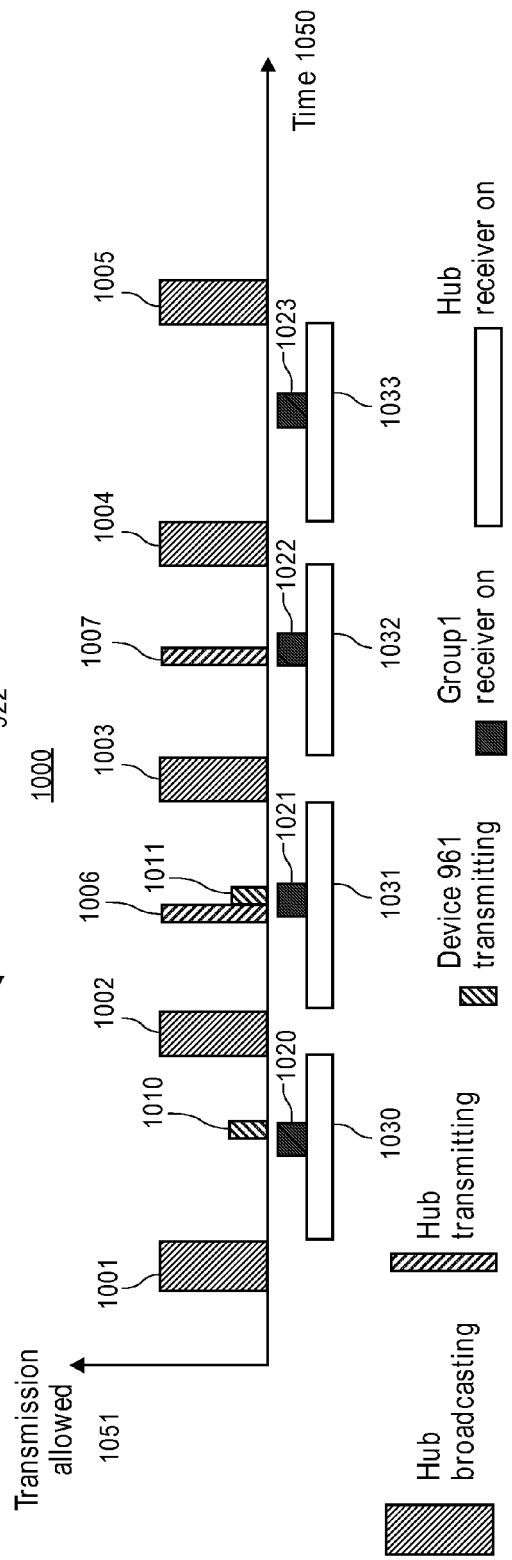

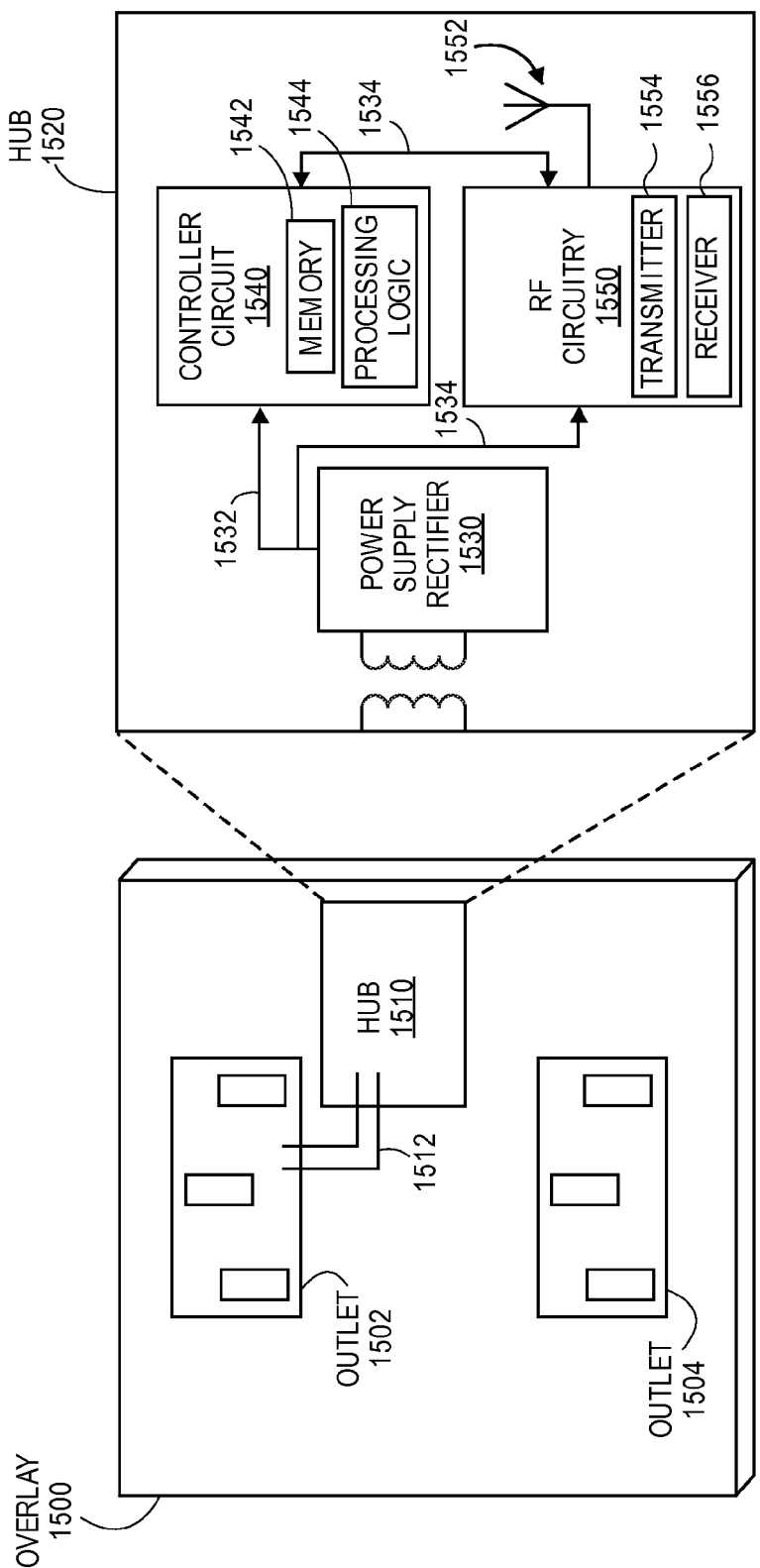

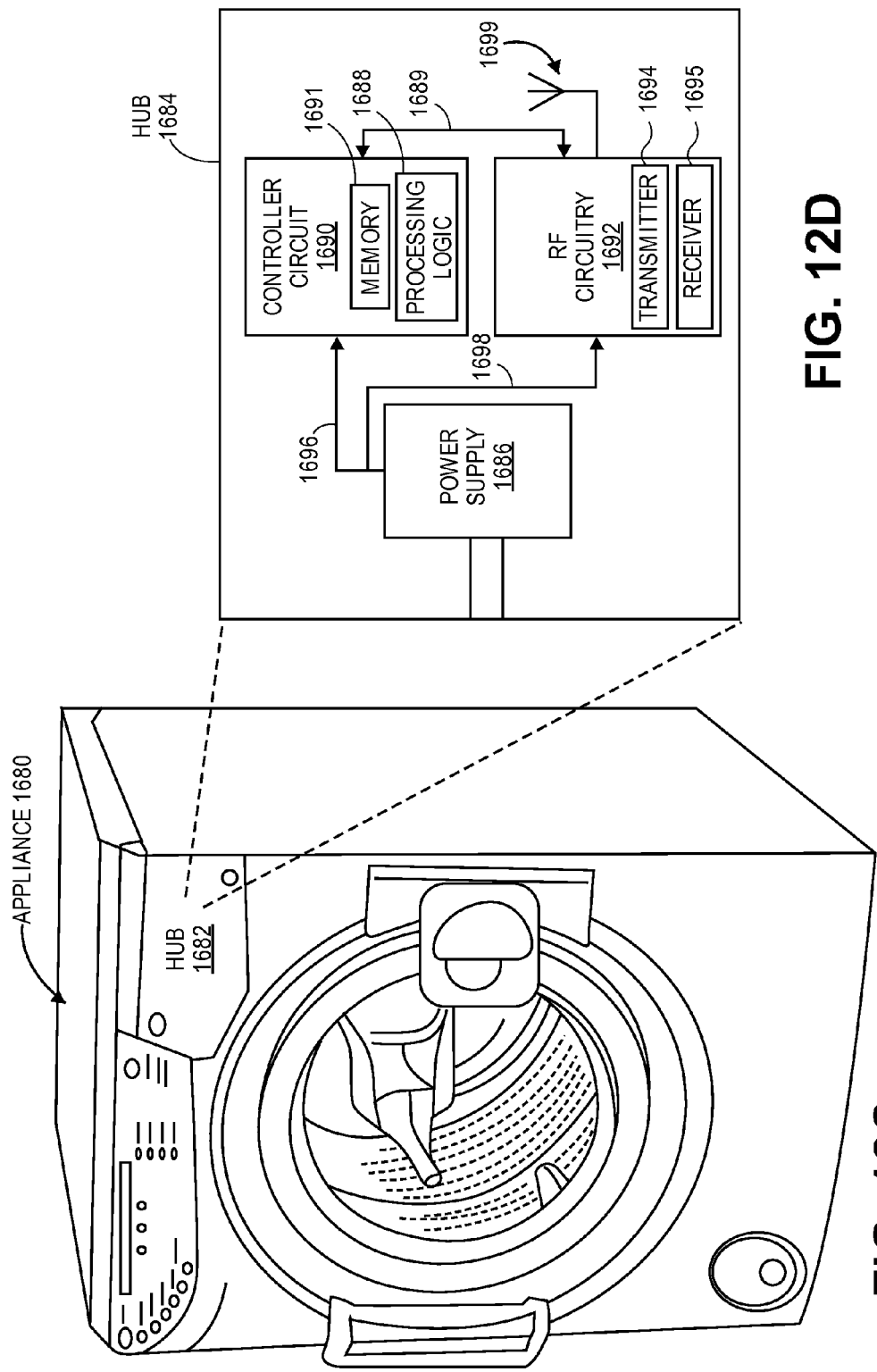

SYSTEMS AND METHODS FOR PROVIDING COMMUNICATIONS WITHIN WIRELESS SENSOR NETWORKS BASED ON AT LEAST ONE PERIODIC GUARANTEED TIME SLOT FOR SENSOR NODES

FIELD

Embodiments of the invention pertain to systems and methods for providing communications within wireless sensor networks based on at least one periodic guaranteed time slot for sensor nodes.

BACKGROUND

In the consumer electronics and computer industries, wireless sensor networks have been studied for many years. In archetypal wireless sensor networks, one or more sensors are implemented in conjunction with a radio to enable wireless collection of data from one or more sensor nodes deployed within a network. Each sensor node may include one or more sensors, and will include a radio and a power source for powering the operation of the sensor node. Prior wireless systems include a repeating timeslot definition signal for defining a timeslot for wireless nodes in a wireless network. A broadcast beacon signal is periodically repeated for a conventional approach (e.g., IEEE 802.15.4). A timeslot definition signal is periodically repeated to define timeslots. A receiver of a node is operable and powered ON for the broadcast beacon signals, timeslot definition signals, and certain timeslots.

However, the timeslot definition signals are repeated frequently and will become impractically longer for a larger number of timeslots. Also, the nodes consume significant power due to needing to have an operable receiver for receiving the broadcast beacon signals, timeslot definition signals, and certain timeslots.

SUMMARY

For one embodiment of the present invention, systems and methods for providing communications within wireless sensor networks based on at least one periodic guaranteed time slot for sensor nodes are disclosed herein.

In one example, a system includes a hub having one or more processing units and RF circuitry for transmitting and receiving communications in a wireless network architecture. The system also includes a plurality of sensor nodes each having a wireless device with a transmitter and a receiver to enable bi-directional communications with the hub in the wireless network architecture. The one or more processing units of the hub are configured to execute instructions to negotiate a timing of the at least one periodic guaranteed time slot for the plurality of sensor nodes one time using a single timeslot definition signal.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which:

FIG. 4 illustrates a time line having a repeating timeslot definition signal for defining a timeslot for wireless nodes in a wireless network in accordance with a conventional approach.

FIG. 5 illustrates a time line having a non-repeating timeslot definition signal for defining timeslots for wireless nodes in a wireless network architecture in accordance with one embodiment.

FIG. 9 illustrates a network architecture for communications between a hub and a group of devices (e.g., sensor nodes) in accordance with one embodiment.

FIG. 10 illustrates a diagram 1000 having communications being transmitted by a hub and groups of wireless nodes in a wireless network architecture in accordance with one embodiment.

FIG. 11A shows an exemplary embodiment of a hub implemented as an overlay 1500 for an electrical power outlet in accordance with one embodiment.

FIG. 11B shows an exemplary embodiment of an exploded view of a block diagram of a hub 1520 implemented as an overlay for an electrical power outlet in accordance with one embodiment.

FIG. 12C shows an exemplary embodiment of a hub implemented within an appliance (e.g., smart washing machine, smart refrigerator, smart thermostat, other smart appliances, etc.) in accordance with one embodiment.

FIG. 12D shows an exemplary embodiment of an exploded view of a block diagram of a hub 1684 implemented within an appliance (e.g., smart washing machine, smart refrigerator, smart thermostat, other smart appliances, etc.) in accordance with one embodiment.

DETAILED DESCRIPTION

Figure 1:
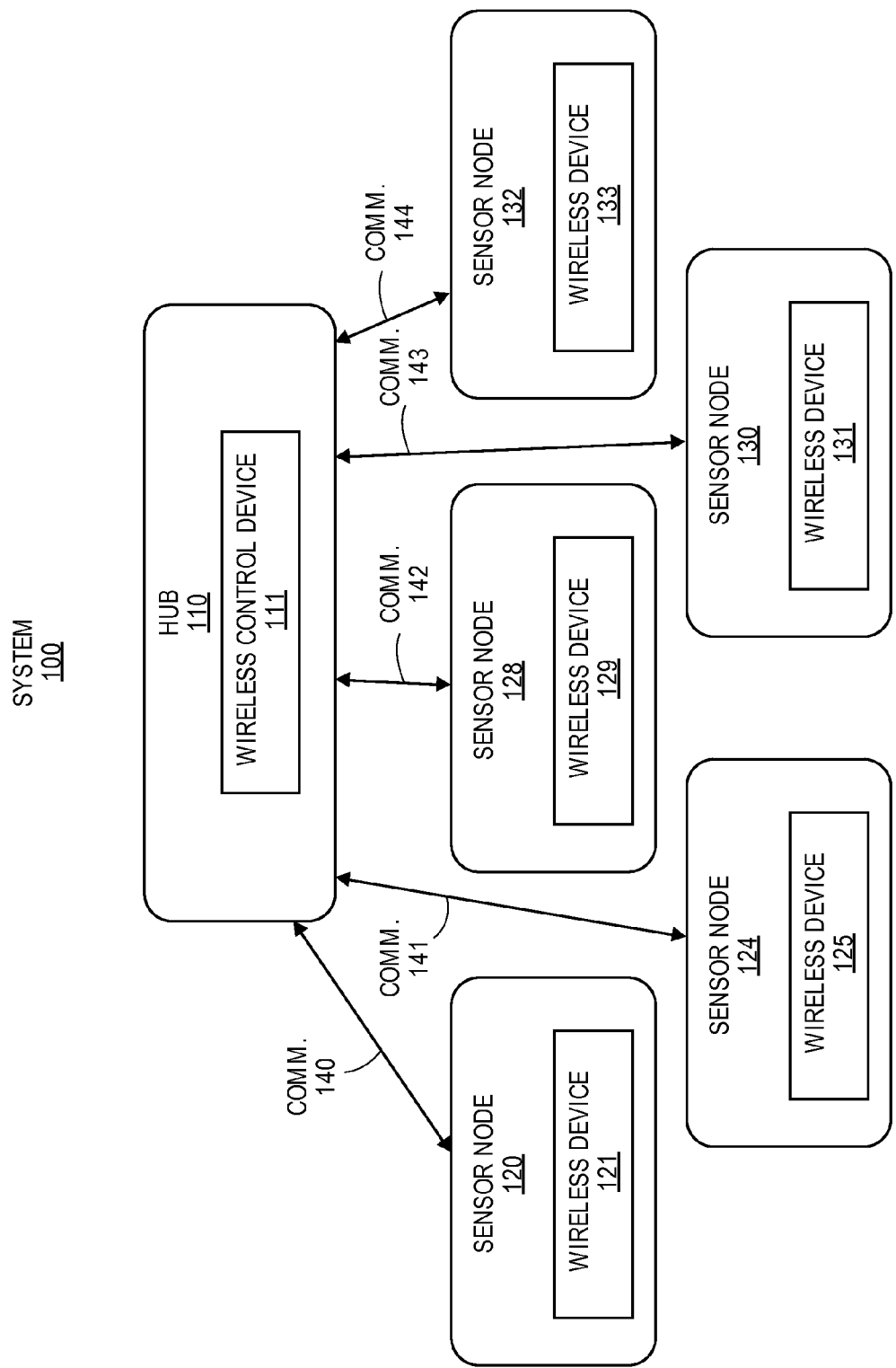
FIG. 1 illustrates an exemplar system of wireless nodes having a periodic guaranteed time slot for communicating in accordance with one embodiment.

Systems and methods for providing communications within wireless sensor networks based on at least one periodic guaranteed time slot for sensor nodes are disclosed herein. In one embodiment, a system includes a hub having one or more processing units and RF circuitry for transmitting and receiving communications in a wireless network architecture. The system also includes a plurality of sensor nodes each having a wireless device with a transmitter and a receiver to enable bi-directional communications with the hub in the wireless network architecture. The one or more processing units of the hub are configured to execute instructions to negotiate a timing of at least one periodic guaranteed time slot for the plurality of sensor nodes once using a single non-repeating timeslot definition signal.

The hub can include RF circuitry that is operable during relevant time periods for receiving and transmitting communications to sensors nodes in wireless networks, particularly in indoor environments. For the purpose of this, indoor environments are also assumed to include near-indoor environments such as in the region around building and other structures, where similar issues (e.g., presence of nearby walls, etc.) may be present.

In one embodiment, sensor nodes of the present design consume significantly less power in comparison to power consumption of nodes of prior approaches at least partially due to having a receiver of the sensor nodes of the present design operable for a shorter time period. The non-repeating timeslot definition signal also saves time and reduces network congestion and bandwidth requirements in comparison to the prior approaches which require the timeslot definition signal to be repeated frequently.

In one embodiment, an asymmetry in power availability may be exploited to provide long range of communication in a wireless asymmetric network architecture while maintaining long battery life for nodes that are powered by a battery source. In an exemplary embodiment, a communication range of 20 meters between communicating nodes may be achieved while providing a long battery life (e.g., approximately 10 years, at least ten years) in battery operated nodes. This may be achieved by implementing an energy aware networking protocol in accordance with embodiments of this invention. Specifically, a tree-like network architecture having mesh based features may be used where long-life battery operated nodes are used on the terminal ends of the tree.

An exemplar tree-like network architecture has been described in U.S. patent application Ser. No. 14/607,045 filed on Jan. 29, 2015, U.S. patent application Ser. No. 14/607,047 filed on Jan. 29, 2015, U.S. patent application Ser. No. 14/607,048 filed on Jan. 29, 2015, and U.S. patent application Ser. No. 14/607,050 filed on Jan. 29, 2015, which are incorporated by reference in entirety herein.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances.

FIG. 1 illustrates an exemplar system of wireless nodes having a periodic guaranteed time slot for communicating in accordance with one embodiment. The system 100 primarily has a tree network architecture that is capable of mesh-like network functionality in accordance with one embodiment. The system 100 primarily has a tree network architecture for standard communications (e.g., (e.g., node identification information, sensor data, node status information, synchronization information, localization information, other such information for the wireless sensor network, time of flight (TOF) communications, etc.). The system 100 includes a hub 110 having a wireless control device 111, a sensor node 120 having a wireless device 121, a sensor node 124 having a wireless device 125, a sensor node 128 having a wireless device 129, a sensor node 130 having a wireless device 131, and a sensor node 132 having a wireless device 133. Additional hubs that are not shown can communicate with the hub 110 or other hubs. Each hub communicates bi-directionally with the sensor nodes 120, 124, 128, 130, and 132. The hubs are also designed to communicate bi-directionally with other devices (e.g., client device, mobile device, tablet device, computing device, smart appliance, smart TV, etc.).

In one embodiment, the control device 111 of the hub 110 is configured to execute instructions to determine or negotiate a timing of at least one periodic guaranteed time slot for the sensor nodes (e.g., nodes 120, 124, 128, 130, 132) one time using a single non-repeating timeslot definition signal.

A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

Figure 2:
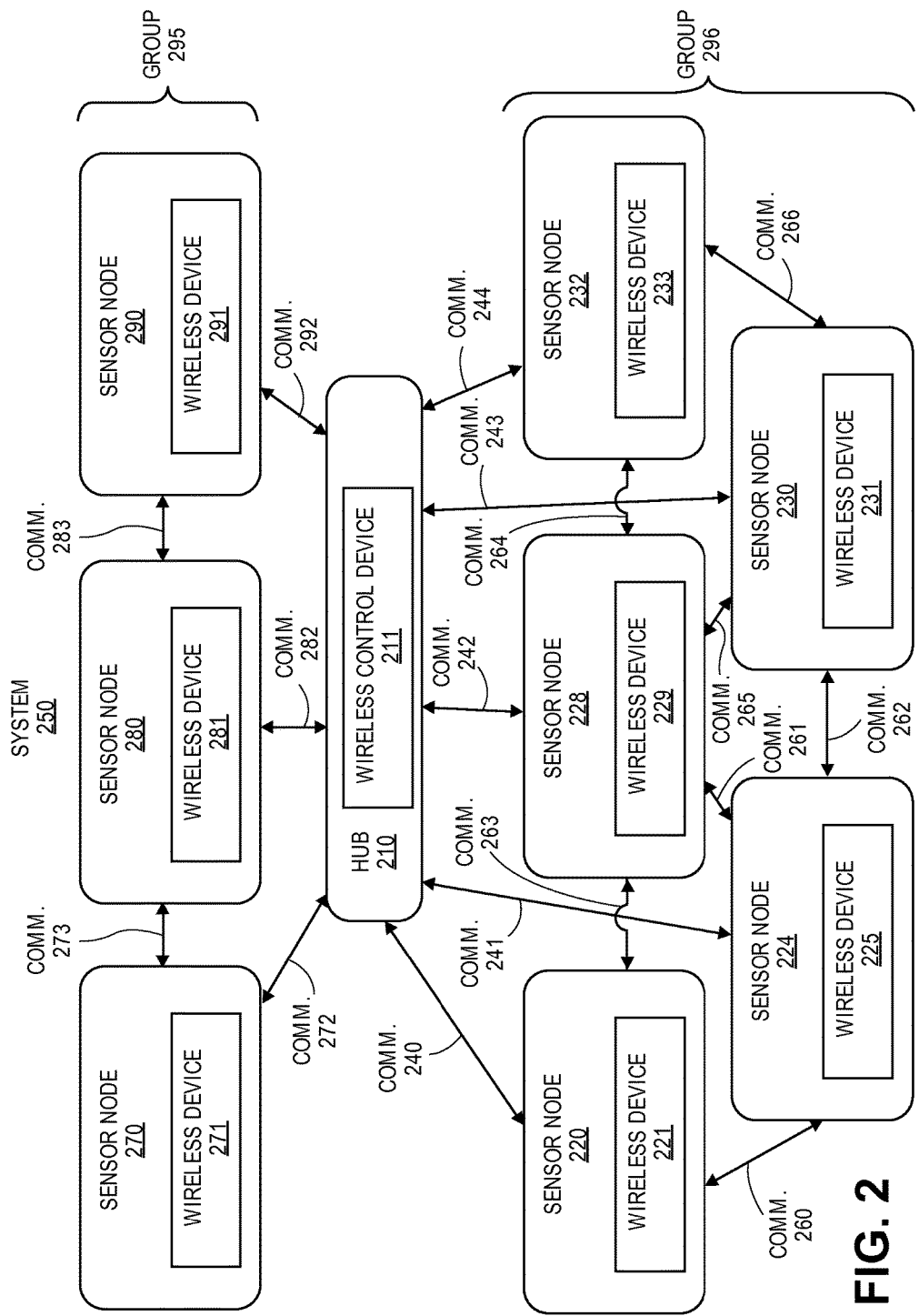
FIG. 2 shows a system primarily having a tree network architecture that is capable of mesh-like network functionality in which each group of sensor nodes is assigned a periodic guaranteed time slot for communicating in accordance with one embodiment.

FIG. 2 shows a system primarily having a tree network architecture that is capable of mesh-like network functionality in which each group of sensor nodes is assigned a periodic guaranteed time slot for communicating in accordance with one embodiment. The system 250 may establish a mesh-like network architecture for determining locations sensor nodes based on a threshold criteria (e.g., movement of at least one node by a certain distance, a change in path length between a node and the hub by a certain distance) being triggered. The system 250 includes a hub 210, a first group 295 of nodes 220, 224, 228, 230, 232 and a second group 296 of nodes 270, 280, and 290. The sensor nodes can be assigned into different groups. In another example, the group 296 is split into a first subgroup of nodes 220 and 224 and a second subgroup of nodes 228, 230, and 232. In one example, each group (or subgroup) is assigned a different periodic guaranteed time slot for communicating with other nodes or hubs.

The hub 210 includes the wireless device 211, the sensor node 220 includes the wireless device 221, the sensor node 224 includes the wireless device 225, the sensor node 228 includes the wireless device 229, the sensor node 230 includes the wireless device 231, the sensor node 232 includes the wireless device 233, the sensor node 270 includes the wireless device 271, the sensor node 280 includes the wireless device 281, and the sensor node 290 includes the wireless device 291. Additional hubs that are not shown can communicate with the hub 210 or other hubs. The hub 210 communicates bi-directionally with the sensor nodes.

These communications include bi-directional communications 240-244, 272, 282, and 292 in the wireless asymmetric network architecture. The sensor nodes communicate bi-directionally with each other based on communications 261-266, 273, and 283 to provide the mesh-like functionality for different applications including determining locations of the hub and sensor nodes.

In one embodiment, the control device 211 of the hub 210 is configured to execute instructions to determine or negotiate a timing of a periodic guaranteed time slot for each group of sensor nodes one time using a single timeslot definition signal.

Figure 3:
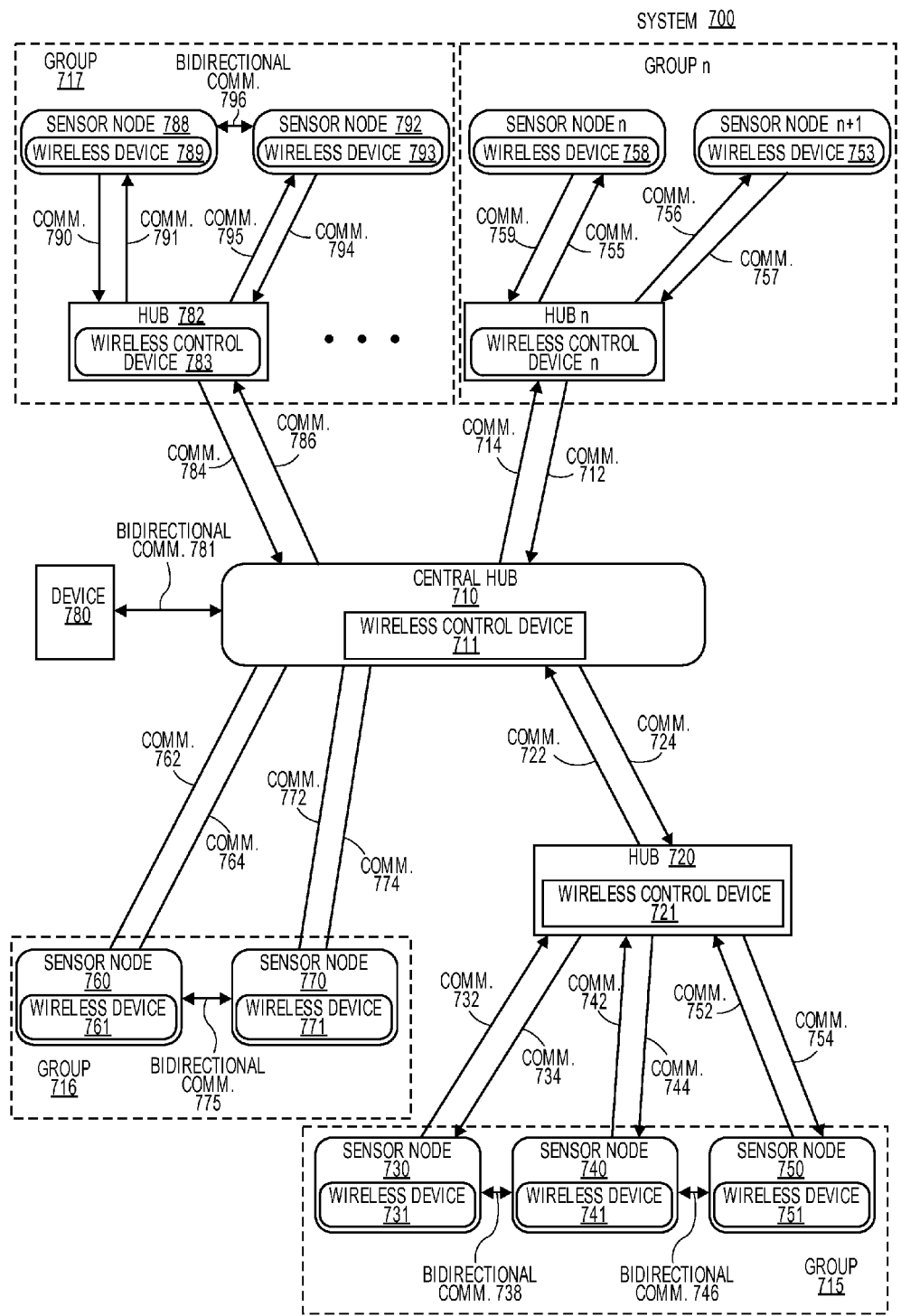
FIG. 3 shows a system with an asymmetric tree and mesh network architecture having multiple hubs in which each group of sensor nodes is assigned a periodic guaranteed time slot for communicating in accordance with one embodiment.

FIG. 3 shows a system with an asymmetric tree and mesh network architecture having multiple hubs in which each group of sensor nodes is assigned a periodic guaranteed time slot for communicating in accordance with one embodiment. The system 700 includes a central hub 710 having a wireless control device 711, hub 720 having a wireless control device 721, hub 782 having a wireless control device 783, and additional hubs including hub n having a wireless control device n. Additional hubs which are not shown can communicate with the central hub 710, other hubs, or can be an additional central hub. Each hub communicates bi-directionally with other hubs and one or more sensor nodes. The hubs are also designed to communicate bi-directionally with other devices including device 780 (e.g., client device, mobile device, tablet device, computing device, smart appliance, smart TV, etc.).

The sensor nodes 730, 740, 750, 760, 770, 788, 792, n, and n+1 (or terminal nodes) each include a wireless device 731, 741, 751, 761, 771, 789, 793, 758, and 753, respectively. A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

In one embodiment, the central hub 710 communicates with hubs 720, 782, hub n, device 780, and nodes 760 and 770. These communications include communications 722, 724, 774, 772, 764, 762, 781, 784, 786, 714, and 712 in the wireless asymmetric network architecture. The central hub having the wireless control device 711 is configured to send communications to other hubs and to receive communications from the other hubs for controlling and monitoring the wireless asymmetric network architecture including assigning groups of nodes and a guaranteed time signal for each group.

The hub 720 communicates with central hub 710 and also sensors nodes 730, 740, and 750. The communications with these sensor nodes include communications 732, 734, 742, 744, 752, and 754. For example, from the perspective of the hub 720, the communication 732 is received by the hub and the communication 734 is transmitted to the sensor node. From the perspective of the sensor node 730, the communication 732 is transmitted to the hub 720 and the communication 734 is received from the hub.

In one embodiment, a central hub (or other hubs) assign nodes 760 and 770 to a group 716, nodes 730, 740, and 750 to a group 715, nodes 788 and 792 to a group 717, and nodes n and n+1 to a group n. In another example, groups 716 and 715 are combined into a single group.

A wireless control device of the central hub, alone or in combination with other hubs, is configured to execute instructions to negotiate a timing of a periodic guaranteed time slot for each group of sensor nodes once using a single timeslot definition signal.

By using the architectures illustrated in FIGS. 1-3, nodes requiring long battery life minimize the energy expended on communication and higher level nodes in the tree hierarchy are implemented using available energy sources or may alternatively use batteries offering higher capacities or delivering shorter battery life. To facilitate achievement of long battery life on the battery-operated terminal nodes, communication between those nodes and their upper level counterparts (hereafter referred to as lowest-level hubs) may be established such that minimal transmit and receive traffic occurs between the lowest-level hubs and the terminal nodes.

In one embodiment, the nodes spend most of their time (e.g., more than 90% of their time, more than 95% of their time, approximately 98% or more than 99% of their time) in a low-energy non-communicative state. When the node wakes up and enters a communicative state, the nodes are operable to transmit data to the lowest-level hubs. This data may include node identification information, sensor data, node status information, synchronization information, localization information and other such information for the wireless sensor network.

FIG. 4 illustrates a time line having a repeating timeslot definition signal for defining a timeslot for wireless nodes in a wireless network in accordance with a conventional approach. A broadcast beacon signal 402-411 is periodically repeated on a time line 450 for a conventional approach (e.g., IEEE 802.15.4). A timeslot definition signal 412-416 is periodically repeated to define timeslots 420-428. The timeslot definition signal 412 defines timeslots 420 and 421, the timeslot definition signal 413 defines timeslots 422 and 423, timeslot definition signal 414 defines timeslots 425 and 426, timeslot definition signal 415 defines timeslots 426 and 427, and timeslot definition signal 416 defines timeslot 428. A receiver of a node is operable and powered ON for the broadcast beacon signals, timeslot definition signals, and certain timeslots as indicated in FIG. 4.

FIG. 5 illustrates a time line having a non-repeating timeslot definition signal for defining timeslots for wireless nodes in a wireless network architecture in accordance with one embodiment. In this embodiment, a broadcast beacon signal 552-556 is periodically repeated on a time line 550. A timeslot definition signal 560 is defined once (non-repeating) to define timeslots 571, 573, 575, 577 and 579. The timeslot definition signal 560 can define a different time slot for each group or constellation of sensor nodes in a wireless network architecture. In one embodiment, this may be accomplished by specifying start and stop times for each time slot associated with each group or constellation, or by providing start times and durations for the same, or by other such specification methods as would be apparent to one of skill in the art. A receiver of at least one node is operable during time periods 581 and 583-587 for the broadcast beacon signal 552, timeslot definition signal 560, and certain timeslots 571, 573, 575, 577, and 579 as indicated in FIG. 5. In some of the receiver powered on times (e.g., 583-587), the receiver may run in a lower power detection mode to reduce overall receiver energy consumption. The receiver operates in the lower power detection mode during the time periods 583-587, which are labeled as sensor receiver low energy detection on in FIG. 5. In this mode, the full RF reception circuitry isn't operative to receive data; rather, the receiver is configured to detect specific incoming signals without operating the entirety of the receiver circuitry, thus reducing energy consumption.

In one embodiment, sensor nodes consume significantly less power as illustrated in FIG. 5 in comparison to power consumption of nodes as illustrated in FIG. 4 at least partially due to having a receiver of the sensor nodes operable for a shorter time period. The non-repeating timeslot definition signal 560 also saves time and reduces network congestion and bandwidth requirements in comparison to the conventional approach of FIG. 4 which requires the timeslot definition signal to be repeated frequently. The timeslot definition signals 412-416 are repeated frequently and will become impractically longer for a larger number of timeslots.

In one embodiment, a system includes a hub having one or more processing units and RF circuitry for transmitting and receiving communications in a wireless network architecture and a plurality of sensor nodes each having a wireless device with a transmitter and a receiver to enable bi-directional communications with the hub in the wireless network architecture. The one or more processing units of the hub are configured to execute instructions to determine or negotiate a timing of at least one periodic guaranteed time slot for the plurality of sensor nodes once using a single timeslot definition signal.

In one example, the plurality of sensor nodes includes a first group of sensor nodes and a second group of sensor nodes. A receiver of at least one of the first group of sensor nodes is configured to be operable during a first periodic guaranteed time slot and a receiver of at least one of the second group of sensor nodes is configured to be operable during a second periodic guaranteed time slot.

In one example, a transmitter of at least one of the first group of sensor nodes is configured to be operable during the first periodic guaranteed time slot and a transmitter of at least one of the second group of sensor nodes is configured to be operable during the second periodic guaranteed time slot.

In one example, the one or more processing units of the hub are configured to execute instructions to receive a transmission during the periodic guaranteed time slots and to determine whether the first group of sensor nodes or the second group of sensor nodes sent the transmission based on a timing of the transmission with respect to the particular guaranteed time slot.

In one example, at least one sensor node is configured to execute instructions to receive a transmission during a particular guaranteed time slot and to determine whether the first group of sensor nodes sent the transmission based on at least a timing of the transmission with respect to the periodic guaranteed time slots without turning on the entire receiver on the sensor node In another example, the at least one sensor node is configured to execute instructions to detect at least one of energy of the transmission and a preamble of the transmission to acknowledge the transmission without consuming power to process data of the transmission.

In one example, the one or more processing units of the hub are configured to execute instructions to broadcast at least one communication to at least one other wireless system with the at least one communication including timeslot definition for the at least one other wireless system and the definition to reserve the location of the periodic time slot for the plurality of sensor nodes within the at least one other system.

Figure 6:
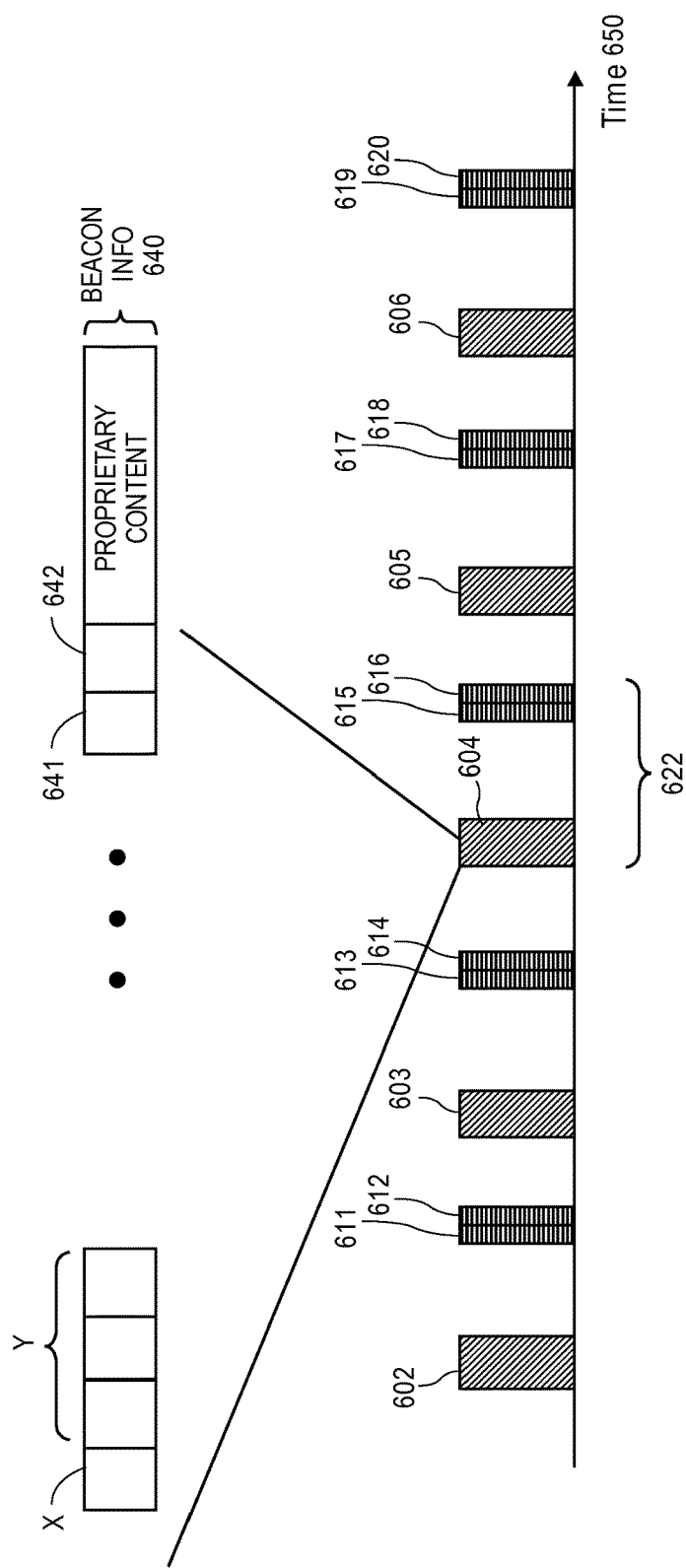
FIG. 6 illustrates a time line having a non-repeating timeslot definition signal for defining timeslots for wireless nodes in a wireless network architecture in accordance with one embodiment.

FIG. 6 illustrates a time line having a non-repeating timeslot definition signal for defining timeslots for wireless nodes in a wireless network architecture in accordance with one embodiment. A broadcast beacon signal 602-606 is periodically repeated on a time line 650. The broadcast beacon signal may include 1 byte field x indicating to other systems that this is a beacon frame followed by field y that can include information where the frame related information 641 and 642 can be found inside the beacon info 640. Frames like 622 are time slots where hub and nodes can communicate without other systems interfering. During the frames, data, acknowledgment, beacon, or MAC command packets can be sent.

Defining the frames using a known protocol in the beginning of the beacon before a proprietary content prevents other system from transmitting during the time periods of the guaranteed time slots. In one example, no other system (e.g., IEEE 802.15.4 systems) will transmit during a time period 622 (or other similar periodic time periods) based on including the frame information 641 and 642 at the beginning of every beacon. The frame order field 642 includes information about the length of the frame and the beacon order field 641 includes the information about the time between two frames.

Figure 7:
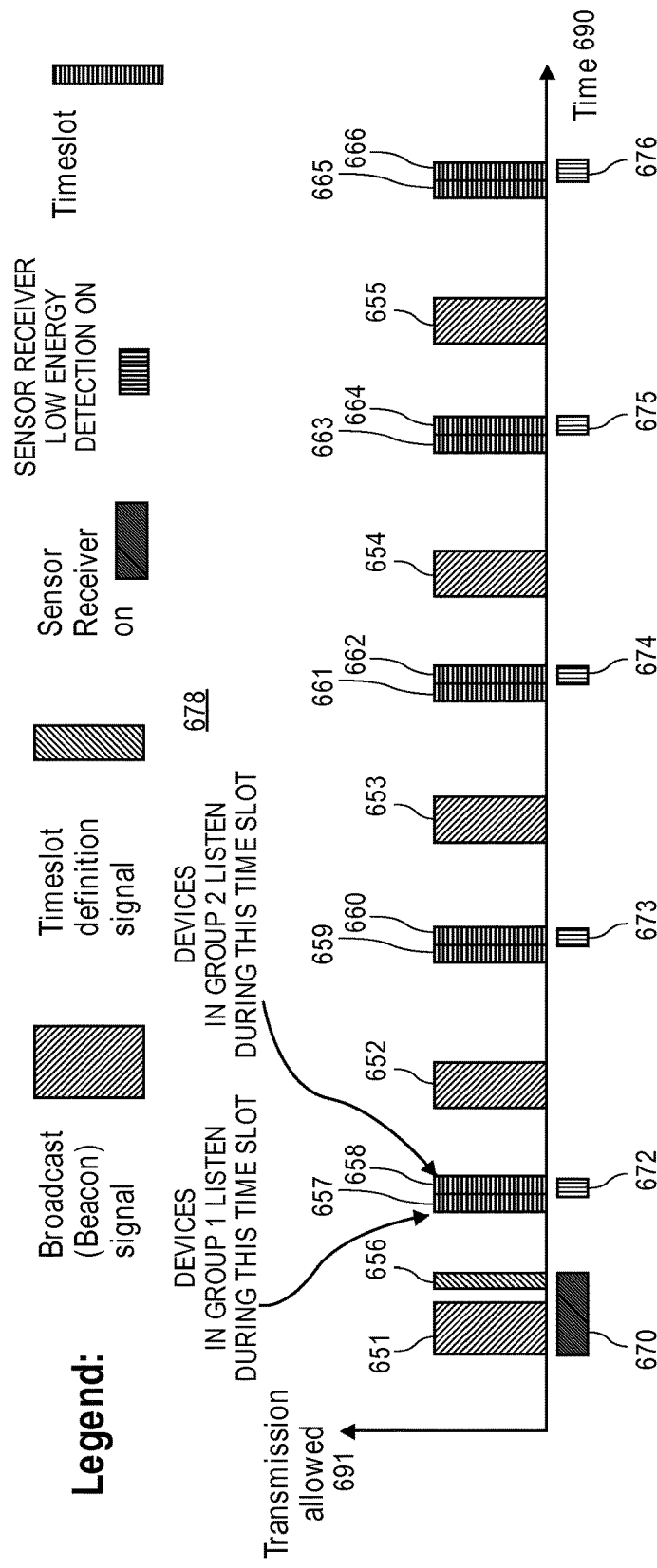
FIG. 7 illustrates a diagram 678 having a non-repeating timeslot definition signal for defining timeslots for multiple groups of wireless nodes in a wireless network architecture in accordance with one embodiment.

FIG. 7 illustrates a diagram 678 having a non-repeating timeslot definition signal for defining timeslots for multiple groups of wireless nodes in a wireless network architecture in accordance with one embodiment. The diagram 678 illustrates a vertical axis (transmission allowed 691) versus a horizontal axis (time line 690) for communications in a wireless sensor network. A broadcast beacon signal 661-655 is periodically repeated (e.g., 50 milliseconds, 100 milliseconds, 200 milliseconds, etc.) on a horizontal axis (time line 690). The broadcast beacon signal may include address information (e.g., optional MAC address info which defines a unique identifier assigned to a network interface (e.g., hub) for communications on a physical network segment) and also information about frames as discussed in conjunction with the description of FIG. 6.

A timeslot definition signal 656 is defined once (non-repeating) to define timeslots 658, 660, 662, 664 and 666. The timeslot definition signal 656 can define a different time slot for each group or constellation of sensor nodes in a wireless network architecture. In one example, devices (e.g., sensor nodes) in a first group have operable receivers for receiving communications during timeslot signals 657, 659, 661, 663, and 665. Devices (e.g., sensor nodes) in a second group have operable receivers for receiving communications during timeslot signals 658, 660, 662, 664, and 666.

A receiver of at least one node of the second group is operable during time periods 670 and 672-676 for the broadcast beacon signal 651, timeslot definition signal 656, and certain timeslots 658, 660, 662, 664, and 666 as indicated in FIG. 7. Defining guaranteed time slots prevents other groups from transmitting during the time periods of the guaranteed time slots.

Figure 8:
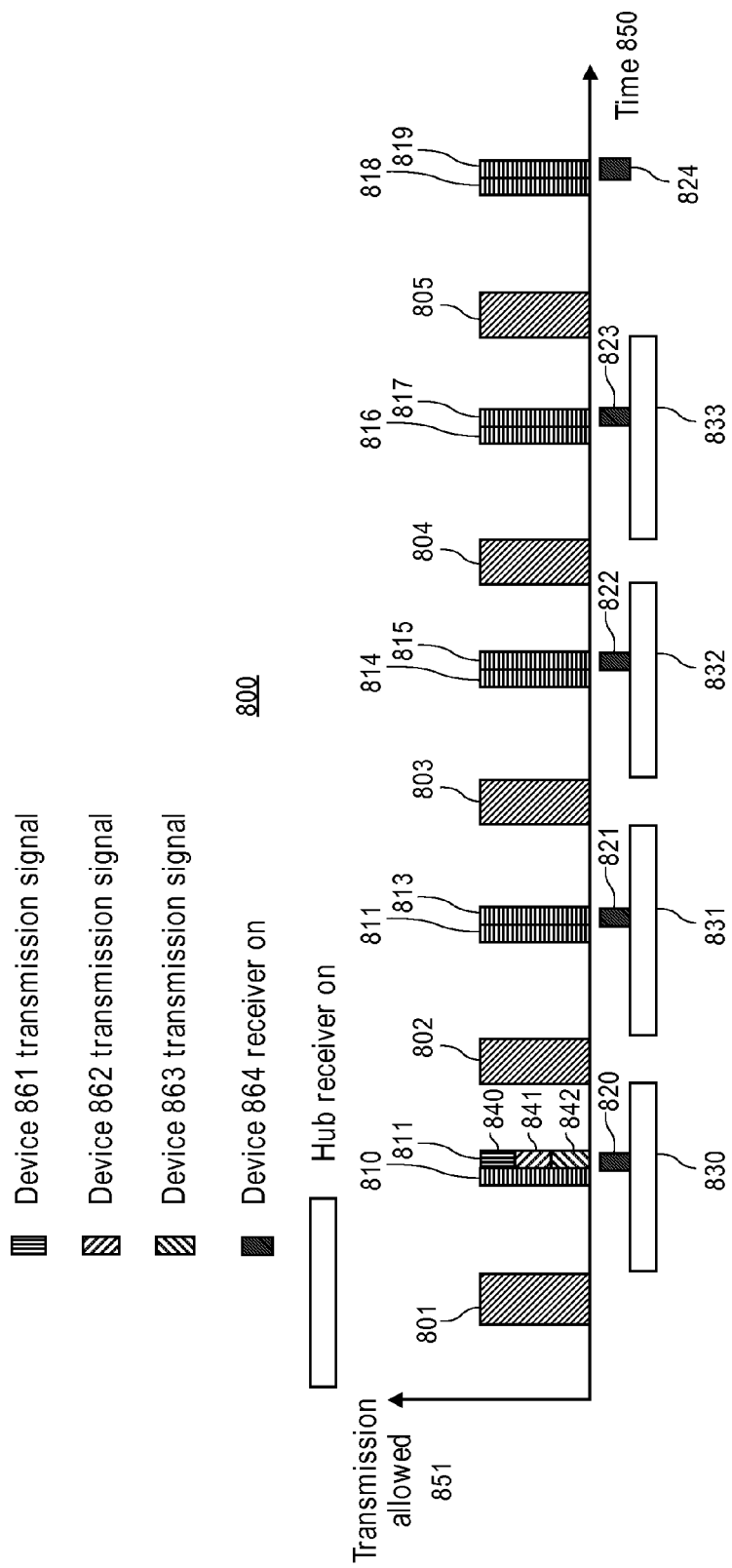
FIG. 8 illustrates a diagram 800 having communications being transmitted by a hub and groups of wireless nodes in a wireless network architecture in accordance with one embodiment.

FIG. 8 illustrates a diagram 800 having communications being transmitted by a hub and groups of wireless nodes in a wireless network architecture in accordance with one embodiment. The diagram 800 illustrates a vertical axis (transmission allowed 851) versus a horizontal axis (time line 850) for communications in a wireless sensor network. A broadcast beacon signal 801-805 is periodically repeated (e.g., 50 milliseconds, 100 milliseconds, 200 milliseconds, etc.) on a time line 850. The broadcast beacon signal may include address information (e.g., optional MAC address info which defines a unique identifier assigned to a network interface (e.g., hub) for communications on a physical network segment) and also information about frames as discussed in conjunction with the description of FIG. 6.

A timeslot definition signal (e.g., timeslot definition signal 656) has been previously defined once (non-repeating) to define timeslots 811, 813, 815, 817 and 819. The timeslot definition signal can define a different time slot for each group or constellation of sensor nodes in a wireless network architecture. In one example, devices (e.g., sensor nodes) in a first group have operable receivers for receiving communications during timeslot signals 810, 812, 814, 816, and 818. Devices (e.g., sensor nodes) in a second group have operable receivers for receiving communications during timeslot signals 811, 813, 815, 817, and 819.

A receiver of at least one node of the second group is operable during time periods 820-824 for certain timeslots 811, 813, 815, 817, and 819 as indicated in FIG. 8. Defining guaranteed time slots prevents other groups from transmitting during the time periods of the guaranteed time slots. A receiver of a hub is operational during time periods 830-833 for receiving communications from sensors nodes in the wireless sensor network.

In one example, a second group of low power sensor nodes includes devices 861-864. The device 864 has an operable receiver during time periods 820-824. The device 864 receives communications from devices 861-863 during time period 820. The devices 861-863 have operable transmitters from transmitting communication signals 840, 841, and 842, respectively during a time slot 811. The device 864 upon receiving the transmitting communications from device 861-863 can then act in accordance with its programming. The device 864 may be configured to execute instructions to detect at least one of energy of the transmissions of devices 861-863 and a preamble of these transmissions. The device 864 may then acknowledge at least one of the transmissions without consuming power to process data of the transmissions. The device 864 does no decoding of actual content of the transmissions. Rather, a device having more power (e.g., hub powered by electrical mains) can also receive these transmissions from device 861-863 and decode the actual content of these transmission. The hub can recognize and identify devices 861-863 based on their individual unique orthogonal transmission codes of communication signals 840-842.

FIG. 9 illustrates a network architecture for communications between a hub and a group of devices (e.g., sensor nodes) in accordance with one embodiment. The network architecture 900 includes the hub 910 and devices 961 and 962 with bi-directional communications 920, 921, and 922 between the hub and the devices 961 and 962. In one example, the hub is powered by an electrical mains while the devices have a limited power supply (e.g., battery, solar, etc.).

FIG. 10 illustrates a diagram 1000 having communications being transmitted by a hub and groups of wireless nodes in a wireless network architecture in accordance with one embodiment. The diagram 1000 illustrates a vertical axis (transmit power 1051) versus a horizontal axis (time line 1050) for communications in a wireless sensor network. A broadcast beacon signal 1001-1005 is periodically repeated (e.g., 50 milliseconds, 100 milliseconds, 200 milliseconds, etc.) on a time line 1050. The broadcast beacon signal may include address information (e.g., optional MAC address info which defines a unique identifier assigned to a network interface (e.g., hub) for communications on a physical network segment) and also information about frames as discussed in conjunction with the description of FIG. 6. A timeslot definition signal (e.g., timeslot definition signal 656) has been previously defined once (non-repeating) to define timeslots that correspond to time periods 1020-1023 for a group of sensor nodes having operational receivers. In one example, devices (e.g., sensor nodes) in a first group have operable receivers for receiving communications during timeslot signals. A hub has a receiver that is operable for receiving communications during time periods 1030-1033. A hub 910 is transmitting at 1006 and 1007. A device 961 is transmitting at 1010 and 1011.

In one example, the signals transmitted by device 961 at 1010 and 1011 are not received by the device 962. The signals may be weak and only detected by the hub 910. The hub 910 can transmit an acknowledgement of the signals transmitted by device 961. The device 962 will receive this acknowledgement during its assigned time slot and act according to its programming. The device 961 may then stop transmitting upon receiving the acknowledgement 1007 from the hub 910. The hub can extend a range of the wireless sensor network by repeating weak signals from a first node to a second node that is not able to receive communications directly from the first node.

In one example, a sensor detects a triggering event that causes the sensor to generate and transmit an alarm signal during a next guaranteed time slot or possibly prior to the next guaranteed time slot. The hub receives the alarm signal and determines an action (e.g., repeating the alarm signal which causes all nodes to wake, causing an alarm signal to be sent to a home owner, police station, fire station, ambulance, etc.) based on receiving the alarm signal. Upon waking other sensor nodes, the hub may receive additional communications from other sensors. The hub can then determine an appropriate action based on the additional communications. For example, all sensors after receiving a wake signal from the hub may capture images and transmit the images to the hub for analysis.

The communication between hubs and nodes as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art.

The implementation of the radio-frequency communication between the terminal nodes and the hubs may be implemented in a variety of ways including narrow-band, channel overlapping, channel stepping, multi-channel wide band, and ultra-wide band communications.

The hubs may be physically implemented in numerous ways in accordance with embodiments of the invention. FIG. 11A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

FIG. 11B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub for forming, monitoring, and performing localization of the wireless asymmetrical network as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 communicates bi-directionally with the controller circuit 1540 via a connection 1534 (e.g., communication link, signal line, electrical connection, etc.). The hub 1520 can be a wireless control device 1520 or the controller circuit 1540, RF circuitry 1550, and antenna(s) 1552 in combination may form the wireless control device as discussed herein.

Figure 12B:
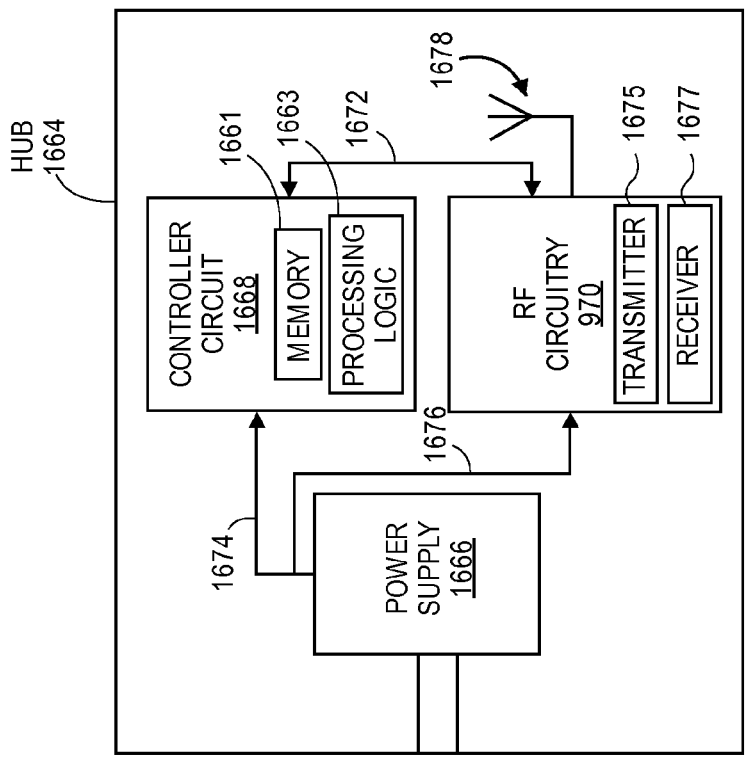
FIG. 12B shows an exemplary embodiment of a block diagram of a hub 1664 implemented as a card for deployment in a computer system, appliance, or communication hub in accordance with one embodiment.
Figure 12A:
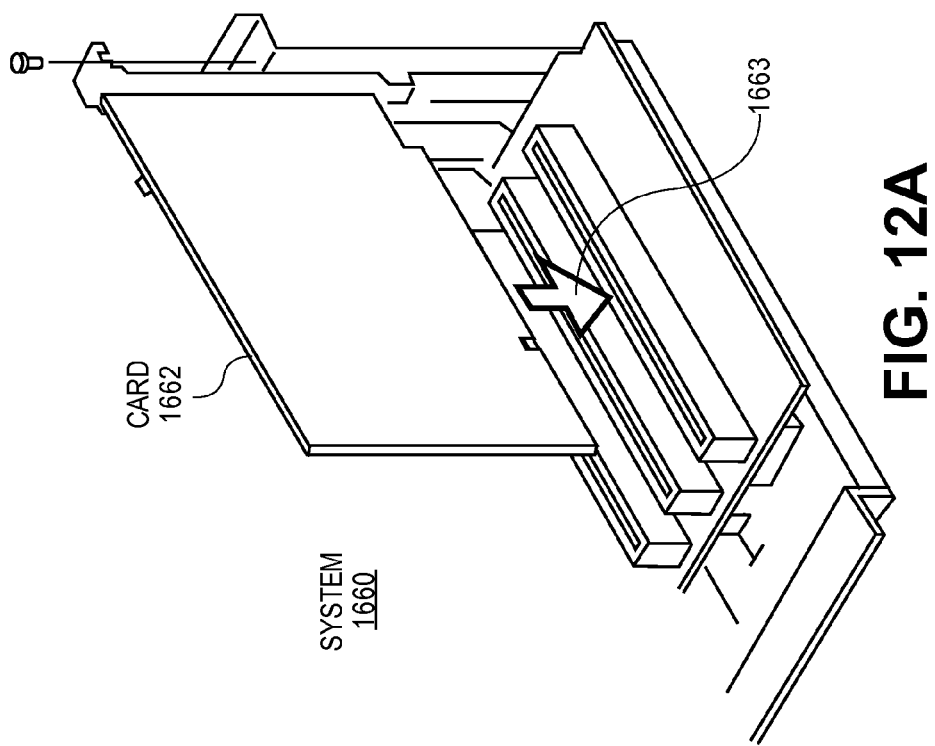
FIG. 12A shows an exemplary embodiment of a hub implemented as a card for deployment in a computer system, appliance, or communication hub in accordance with one embodiment.

FIG. 12A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1663.

FIG. 12B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and communicating within the wireless asymmetrical network as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 communicates bi-directionally with the controller circuit 1668 via a connection 1672 (e.g., communication link, signal line, electrical connection, etc.). The hub 1664 can be a wireless control device 1664 or the controller circuit 1668, RF circuitry 1670, and antenna(s) 1678 in combination may form the wireless control device as discussed herein.

FIG. 12C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 12D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The hub 1684 can be a wireless control device 1684 or the controller circuit 1690, RF circuitry 1692, and antenna(s) 1699 in combination may form the wireless control device as discussed herein.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuity 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture. The processing logic (e.g., one or more processing units) is configured to execute instructions to determine or negotiate a timing of at least one periodic guaranteed time slot for the plurality of sensor nodes once using a non-repeating timeslot definition signal.

In one example, the plurality of sensor nodes includes a first group of sensor nodes and a second group of sensor nodes. A transmitter of at least one of the first group of sensor nodes is configured to be operable during a first periodic guaranteed time slot and a transmitter of at least one of the second group of sensor nodes is configured to be operable during a second periodic guaranteed time slot.

In one example, the one or more processing units of the hub are configured to execute instructions to receive a transmission during the at least one periodic guaranteed time slot and to determine whether the first group of sensor nodes or the second group of sensor nodes sent the transmission based on a timing of the transmission with respect to the at least one periodic guaranteed time slot.

In one example, the one or more processing units of the hub are configured to execute instructions to periodically broadcast at least one communication to at least one other wireless system with the at least one communication including commands for the at least one other wireless system. The at least one communication may include a frame length and a periodicity for reserving a periodic time period for sending and receiving communications within the wireless network architecture.

In one example, the periodic time period includes the guaranteed time slot for the plurality of sensor nodes.

Various batteries could be used in the wireless sensor nodes, including lithium-based chemistries such as Lithium Ion, Lithium Thionyl Chloride, Lithium Manganese Oxide, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 13:
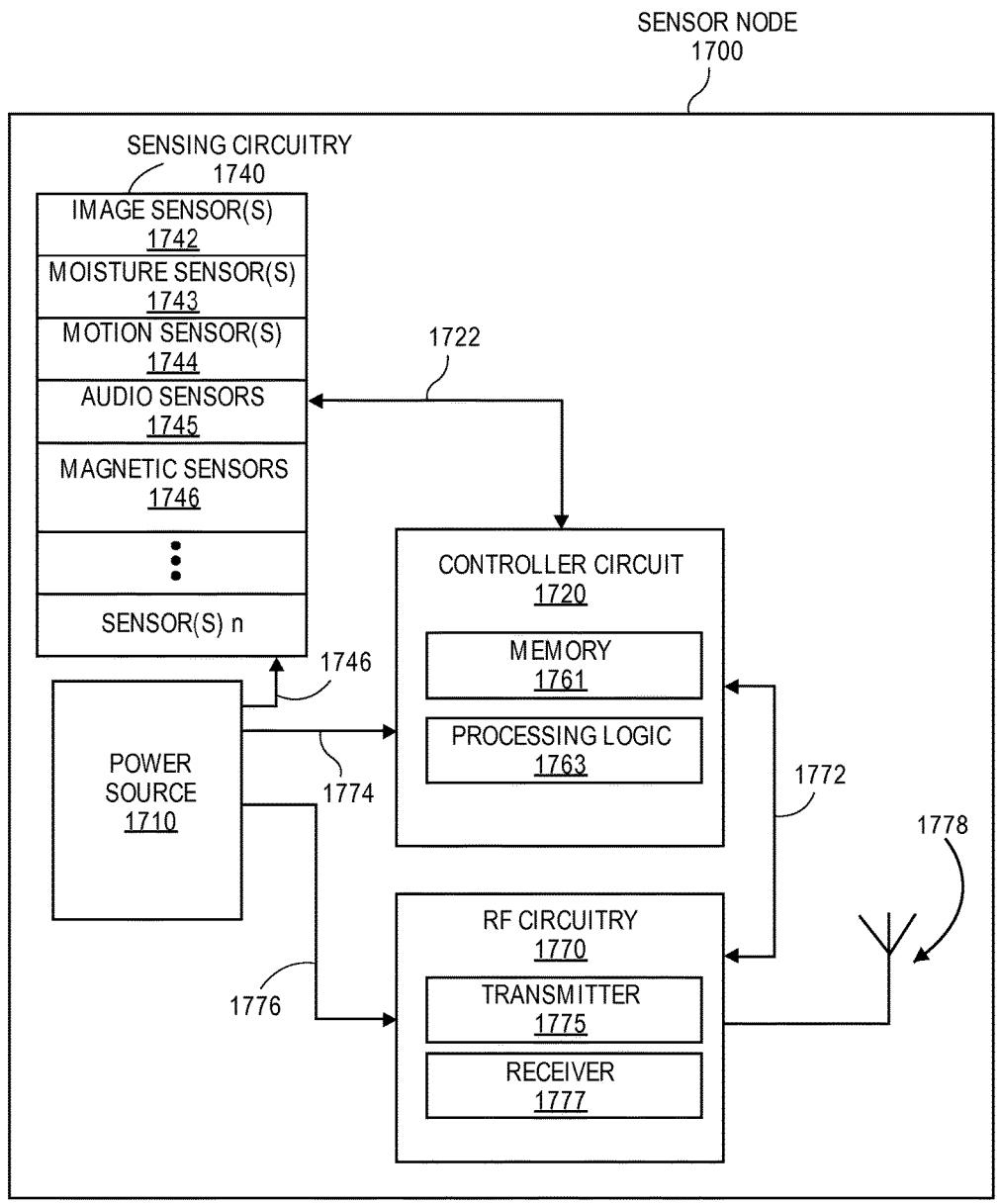
FIG. 13 illustrates a block diagram of a sensor node in accordance with one embodiment.

FIG. 13 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

In one embodiment, a sensor node for a wireless network architecture includes at least one sensor, a memory for storing instructions, processing logic coupled to the memory and the at least one sensor. The processing logic executes instructions for processing data received from the at least one sensor and for processing communications for the sensor node. The sensor node includes radio frequency (RF) circuitry that is coupled to the processing logic. The RF circuitry includes transmitter and receiver functionality to transmit communications to a hub and to receive communications from the hub in the wireless network architecture. The processing logic is configured to execute instructions to receive communications during at least one periodic guaranteed time slot that is defined once using a single timeslot definition signal.

In one example, the sensor node is assigned to the at least one periodic guaranteed time slot. The receiver functionality of the sensor node is configured to be operable during the at least one periodic guaranteed time slot.

In one example, the receiver functionality of the sensor node is configured to be operable during the periodic guaranteed time slot. In one example, the processing logic is configured to execute instructions to receive a transmission and to determine whether a sensor node sent the transmission based on a timing of the transmission with respect to the at least one periodic guaranteed time slot without determining a data pattern having a unique code for the transmission.

In one example, the sensor node is configured to execute instructions to detect at least one of energy of the transmission and a preamble of the transmission to ascertain the transmission without consuming power to process data of the transmission.

In one example, the sensor node to operate with a battery source.

Figure 14:
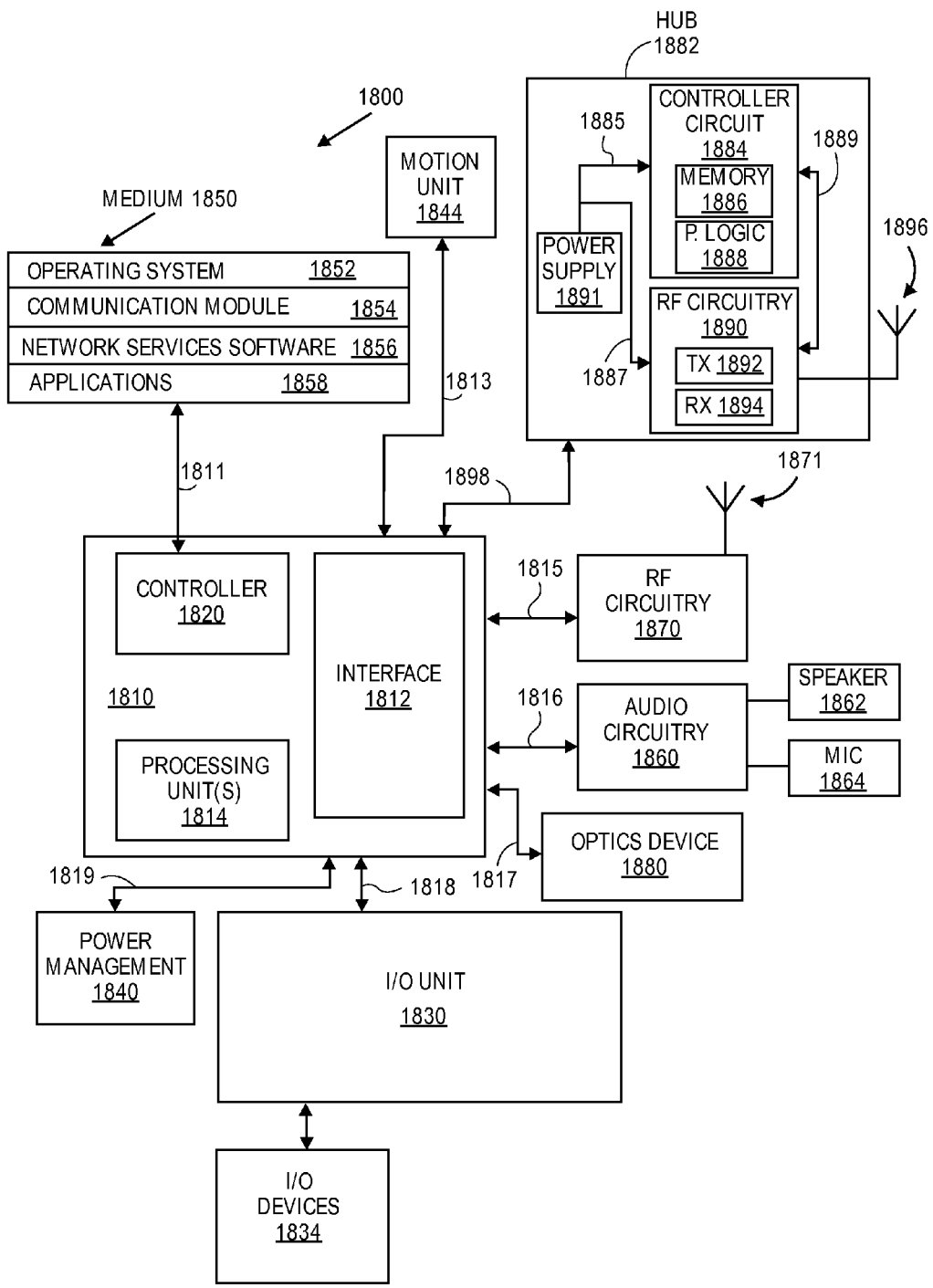
FIG. 14 illustrates a block diagram of a system or appliance 1800 having a hub in accordance with one embodiment.

FIG. 14 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system, comprising:
    a hub having one or more processing units and RF circuitry for transmitting and receiving communications in a wireless network architecture; and
    a plurality of sensor nodes each having a wireless device that includes circuitry with a transmitter and a receiver to enable bi-directional communications with the hub in the wireless network architecture,
    wherein the one or more processing units of the hub are configured to execute instructions
    to determine a timing of at least one periodic guaranteed time slot for the plurality of sensor nodes,
    to determine a single timeslot definition signal that is defined with the timing of a first periodic guaranteed time slot for a first group of sensor nodes and a second periodic guaranteed time slot for a second group of sensor nodes of the plurality of sensor nodes,
    to transmit a first periodic beacon signal and the single timeslot definition signal to the plurality of sensor nodes,
    to transmit a second periodic beacon signal without the single timeslot definition signal to the plurality of sensor nodes, and
    to decode content of transmissions received from the second group of sensor nodes during the second periodic guaranteed time slot,
    wherein the single timeslot definition signal is separate from the periodic beacon signal,
    wherein at least one sensor node of the second group of sensor nodes is configured to detect a preamble of a transmission from one of the other sensor nodes of the second group of sensors nodes without decoding at least some of the content of the transmission during the second periodic guaranteed time slot to ascertain the transmission without needing to process data of the transmission.

2. The system of claim 1, wherein a receiver of at least one of the first group of sensor nodes is configured to be operable during the first periodic guaranteed time slot and a receiver of at least one of the second group of sensor nodes is configured to be operable in a low energy receive mode detection during the second periodic guaranteed time slot, wherein the receiver of at least one of the second group of sensor nodes is configured to be operable in a receive mode detection during the first periodic beacon signal.

3. The system of claim 2, wherein a transmitter of at least one of the first group of sensor nodes is configured to be operable during the first periodic guaranteed time slot and a transmitter of at least one of the second group of sensor nodes is configured to be operable during the second periodic guaranteed time slot.

4. The system of claim 3, wherein the one or more processing units of the hub are configured to execute instructions to receive a transmission during the first and second periodic guaranteed time slots and to determine whether the first group of sensor nodes or the second group of sensor nodes sent the transmission based on a timing of the transmission with respect to the first and second periodic guaranteed time slots.

5. The system of claim 3, wherein at least one sensor node is configured to execute instructions to receive a transmission during the at least one periodic guaranteed time slot and to determine whether the first group of sensor nodes or the second group of sensor nodes sent the transmission based on at least the timing of the transmission with respect to the at least one periodic guaranteed time slot without determining a data pattern having a unique code for the transmission.

6. The system of claim 5, wherein the at least one sensor node is configured to execute instructions to detect at least one of energy of the transmission and a preamble of the transmission to ascertain the transmission without consuming power to process data of the transmission.

7. The system of claim 1, wherein the one or more processing units of the hub are configured to execute instructions to broadcast at least one communication to at least one other wireless system with the at least one communication including timeslot definitions for the at least one other wireless system and the timeslot definitions reserving the location of the at least one periodic guaranteed time slot for the plurality of sensor nodes within the at least one other system.

8. An apparatus, comprising:
a memory for storing instructions;
one or more processing units to execute instructions for monitoring a plurality of sensor nodes in a wireless network architecture; and
radio frequency (RF) circuitry to transmit communications to and receive communications from the plurality of sensor nodes each having a wireless device that includes circuitry with a transmitter and a receiver to enable bi-directional communications with the RF circuitry of the apparatus in the wireless network architecture, wherein the one or more processing units of the apparatus are configured to execute instructions
to negotiate a timing of at least one periodic guaranteed time slot for the plurality of sensor nodes using a single timeslot definition signal that is defined with a timing of a first periodic guaranteed time slot for a first group of sensor nodes and a second periodic guaranteed time slot for a second group of sensor nodes of the plurality of sensor nodes,
to transmit a first periodic beacon signal and the single timeslot definition signal to the plurality of sensor nodes, and
to transmit a second periodic beacon signal without the single timeslot definition signal to the plurality of sensor nodes, and
to decode content of transmissions received from the second group of sensor nodes during the second periodic guaranteed time slot,
wherein the single timeslot definition signal is separate from the periodic beacon signal, wherein at least one sensor node of the second group of sensor nodes is configured to detect a preamble of a transmission from one of the other sensor nodes of the second group of sensors nodes without decoding at least some of the content of the transmission during the second periodic guaranteed time slot to ascertain the transmission without needing to process data of the transmission.

9. The apparatus of claim 8, wherein a transmitter of at least one of the first group of sensor nodes is configured to be operable during a first periodic guaranteed time slot and a transmitter of at least one of the second group of sensor nodes is configured to be operable during the first or a second periodic guaranteed time slot.

10. The apparatus of claim 9, wherein the one or more processing units of the hub are configured to execute instructions to receive a transmission during the periodic guaranteed time slot and to determine whether the first group of sensor nodes or the second group of sensor nodes sent the transmission based on a timing of the transmission with respect to the periodic guaranteed time slots.

11. The apparatus of claim 8, wherein the one or more processing units of the hub are configured to execute instructions to periodically broadcast at least one communication to at least one other wireless system with the at least one communication including definitions for the at least one other wireless system.

12. The apparatus of claim 11, wherein the at least one communication includes a frame length and periodicity for reserving a periodic time period for sending and receiving communications within the wireless network architecture.

13. The apparatus of claim 11, wherein a periodic broadcast transmission of the at least one communication includes the guaranteed time slot definitions for the plurality of sensor nodes.

14. A sensor node for a wireless network architecture, comprising:
at least one sensor;
a memory for storing instructions;
processing logic coupled to the memory and the at least one sensor, the processing logic to execute instructions for processing data received from the at least one sensor and for processing communications for the sensor node; and
radio frequency (RF) circuitry coupled to the processing logic, the RF circuitry includes transmitter and receiver functionality to transmit communications to a hub and to receive communications from the hub in the wireless network architecture,
wherein the processing logic is configured to execute instructions to receive a first periodic beacon signal from the hub and a single timeslot definition signal from the hub that defines a first periodic guaranteed time slot for a first group of sensor nodes and a second periodic guaranteed time slot for a second group of sensor nodes of the plurality of sensor nodes and to receive a second periodic beacon signal from the hub without the single timeslot definition signal,
wherein the hub is configured to decode content of transmissions received from the second group of sensor nodes during the second periodic guaranteed time slot,
wherein the single timeslot definition signal is separate from the periodic beacon signal, wherein the sensor node is configured to detect a preamble of a transmission from one of the sensor nodes of the second group of sensors nodes without decoding at least some of the content of the transmission during the second periodic guaranteed time slot to ascertain the transmission without needing to process data of the transmission.

15. The sensor node of claim 14, wherein the sensor node is assigned to at least one periodic guaranteed time slot, wherein the receiver functionality of the sensor node is configured to be operable during the at least one periodic guaranteed time slot.

16. The sensor node of claim 14, wherein the receiver functionality of the sensor node is configured to be operable during the at least one periodic guaranteed time slot.

17. The sensor node of claim 14, wherein the processing logic is configured to execute instructions to receive a transmission and to determine whether a sensor node sent the transmission based on a timing of the transmission with respect to the at least one periodic guaranteed time slot without determining a data pattern having a unique code for the transmission.

18. The sensor node of claim 17, wherein the processing logic is configured to execute instructions to detect at least one of energy of the transmission and a preamble of the transmission to acknowledge the transmission without consuming power to process data of the transmission.

19. The sensor node of claim 14, wherein the sensor node to operate with a battery source.

* * * * *